(12) United States Patent
Qi (10) Patent No.: US 11,368,902 B2
(45) Date of Patent: Jun. 21, 2022

(54) APPARATUS AND METHOD FOR INTEGRATED ACCESS AND BACKHAUL IN WIRELESS COMMUNICATION SYSTEM

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/830,664

(22) Filed: Mar. 26, 2020

(65) Prior Publication Data

US 2020/0314738 A1    Oct. 1, 2020

(30) Foreign Application Priority Data

Mar. 29, 2019    (GB) .................................... 1904456

(51) Int. Cl.

| H04W 48/16 | (2009.01) |
| H04W 76/28 | (2018.01) |
| H04W 76/27 | (2018.01) |
| H04W 24/10 | (2009.01) |
| H04W 56/00 | (2009.01) |
| H04W 88/14 | (2009.01) |
| H04W 92/10 | (2009.01) |

(52) U.S. Cl.
CPC ........... *H04W 48/16* (2013.01); *H04W 24/10* (2013.01); *H04W 56/0015* (2013.01); *H04W 76/27* (2018.02); *H04W 76/28* (2018.02); *H04W 88/14* (2013.01); *H04W 92/10* (2013.01)

(58) Field of Classification Search
CPC ..... H04W 48/16; H04W 76/28; H04W 76/27; H04W 24/10; H04W 56/0015; H04W 88/14; H04W 92/10; H04W 56/001; H04L 5/0091
See application file for complete search history.

(56) References Cited

U.S. PATENT DOCUMENTS

2018/0352524 A1* 12/2018 Abedini .................. H04L 5/005
2019/0081721 A1    3/2019 Ly et al.

FOREIGN PATENT DOCUMENTS

WO    2018/063892 A1    4/2018

OTHER PUBLICATIONS

NTT Docomo, Inc., 'Extensions of SSBs for inter-IAB-node discovery and measurements', R1-1902794, 3GPP TSG RAN WG1 #96, Athens, Greece, Feb. 15, 2019, sections 1-2.
Samsung, 'Support of SSBs for IAB Node Discovery and Measurement', R1-1902269, 3GPP TSG RAN WG1 #96, Athens, Greece, Feb. 15, 2019, sections 1, 3.

(Continued)

*Primary Examiner* — Diane D Mizrahi
(74) *Attorney, Agent, or Firm* — Jefferson IP Law, LLP (57) ABSTRACT

A method of operating a node, for inter-node discovery, in a telecommunication network, the node being configured for Integrated Access and Backhaul (IAB) is provided. The method includes the steps of defining a Synchronization Signal Block (SSB) Transmission Configuration (STC) comprising information elements related to one or more of numerology, periodicity, offset, duration, SSB index, or location in the frequency domain; and transmitting, by the node, an SSB or SSB burst set according to the information elements in the STC.

20 Claims, 5 Drawing Sheets

(56) References Cited

OTHER PUBLICATIONS

Huawei et al., 'SSB-based discovery and measurement for IAB', R1-1901531, 3GPP TSG RAN WG1 Meeting #96, Athens, Greece, Feb. 16, 2019, section 3.
AT&T, 'Enhancements to support inter-IAB node discovery and measurements', R1-1901890, 3GPP TSG RAN WG1 #96, Athens, Greece, Feb. 16, 2019, section 2.
International Search Report dated Jul. 8, 2020, issued in International Application No. PCT/KR2020/004149.
NTT Docomo, Inc., Extensions of SSBs for inter-IAB-node discovery and measurements, 3GPP TSG RAN WG1 #96 R1-1902794, Athens, Greece, Feb. 25-Mar. 1, 2019.
ZTE, Sanechips, Discussion of SSB for inter-IAB-node discovery and measurements, 3GPP TSG RAN WG1 Meeting #96, R1-1902197, Athens, Greece, Feb. 25-Mar. 1, 2019.
Samsung, Support of SSBs for IAB Node Discovery and Measurement, 3GPP TSG RAN WG1 #96 R1-1902269, Athens, Greece, Feb. 25-Mar. 1, 2019.
3GPP, "Technical Specification Group Radio Access Network; NR; Study on Integrated Access and Backhaul", 3rd Generation Partnership Project (3GPP), 3GPP TR 38.874, VI6.0.0, pp. 17-18, Jan. 10, 2019.
Great Britain office action dated Sep. 11, 2019, issued in Great Britain Application No. 1904456.9.
Great Britain office action dated May 26, 2021, issued in Great Britain Application No. 1904456.9.
Qualcomm Incorporated, Extensions of SSBs for inter-IAB-node discovery and measurements, 3GPP TSG RAN WG1, Meeting #96, R1-1902990, Athens, Greece Feb. 25-Mar. 1, 2019.
Vivo, Discussion on extension of SSBs for inter-IAB-node discovery and measurements, 3GPP WG1 Ad-Hoc Meeting 1901, R1-1901680, Athens, Greece Feb. 25-Mar. 1, 2019.
Lenovo, Motorola Mobility, Discussion on discovery and measurement for IAB network, R1-1902154, 3GPP TSG RAN WG1# 96, R1-1902154, Athens, Greece Feb. 25-Mar. 1, 2019.
Intel Corporation, SSBs for Inter-IAB Node Discovery and Measurements, 3GPP TSG RAN WG1#96, R1-1902477, Athens, Greece, Feb. 25-Mar. 1, 2019.
European Search Report dated Apr. 13, 2022, issued in European Application No. 20783770.9.

* cited by examiner

APPARATUS AND METHOD FOR INTEGRATED ACCESS AND BACKHAUL IN WIRELESS COMMUNICATION SYSTEM

CROSS-REFERENCE TO RELATED APPLICATION(S)

This application is based on and claims priority under 35 U.S.C. § 119(a) of a United Kingdom patent application number 1904456.9, filed on Mar. 29, 2019, in the United Kingdom Intellectual Property Office, the disclosure of which is incorporated by reference herein in its entirety.

BACKGROUND

The disclosure relates to improvements to the operation of a telecommunication network by means of enhanced definition and operation of Synchronization Signal Block (SSB) Transmission Configuration (STC) and SSB Measurement Timing Configuration (SMTC) in an Integrated Access and Backhaul (IAB) arrangement. More particularly, the disclosure relates to Fifth Generation (5G) or New Radio (NR) systems but may apply in other systems also.

DESCRIPTION OF RELATED ART

IAB refers to a configuration whereby air interface (i.e. access) channels are utilized for backhaul links. This arrangement raises certain issues in network configuration and operation.

It is an aim of embodiments of the disclosure to address problems and shortcomings in the prior art, whether mentioned herein or not.

In the prior art standardization process, it has been agreed that SSB transmission and measurement for inter-node discovery in IAB is configured in a centralized way by the Central Unit (CU) and configuration details are to be decided later.

It is an aim of embodiments of the disclosure to address issues with the prior art, whether mentioned herein or not.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method as set forth in the appended claims.

Additional aspects will be set forth in part in the description which follows and, in part, will be apparent from the description, or may be learned by practice of the presented embodiments.

In accordance with aspect of the disclosure, a method of operating a node, for inter-node discovery, in a telecommunication network, the node being configured for Integrated Access and Backhaul, IAB, comprising the steps of defining a Synchronization Signal Block, SSB, Transmission Configuration, STC, comprising information elements related to one or more of numerology, periodicity, offset, duration, SSB index and location in the frequency domain, the node transmitting an SSB or SSB burst set according to the information elements in the STC is provided.

A plurality of STCs are defined, relating to at least one of Initial Access (IAS), and Inter-IAB node discovery (IND).

For the IND case, a plurality of STCs may be defined up to a maximum value $K_{IND}$, which is determined by one or more of hop order, maximum number of neighboring IAB nodes, or maximum number of (SSB) Timing Configurations (SMTCs) per IAB node.

STCs of different IAB nodes may be configured to be either adjacent or substantially adjacent to each other within a defined time period, or non-adjacent to each other within a defined time period.

There may be further provided an operation of defining at least one SSB Measurement Timing Configuration (SMTC) per IAB node, such that the at least one SMTC configuration is co-ordinated with the respective STC configuration.

A pci-list may be configured for each at least one SMTC, detailing which neighboring nodes are to be measured.

The duration of each SMTC may be defined such that multiple neighboring nodes are measured within one SMTC duration.

The duration may be defined such that it collides with its own STC configuration and the STC configuration overrides the SMTC configuration.

STC configuration may be coordinated across different IAB nodes. This allows the SMTC configuration complexity to be reduced.

The SMTC configuration may depend on RRC state or DRX state.

In accordance with another aspect of the disclosure, apparatus arranged to perform the method of the first aspect is provided.

Embodiments of the disclosure provide configuration details for STC and SMTC for inter-node discovery and measurement in IAB networks subject to half-duplex constraint.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the present disclosure provide STCs to address the aforementioned issues in the prior art.

An STC comprises a plurality of Information Elements (IEs). For each STC, one or more of the following IEs may be configured:

Numerology: SSB numerology including SCS and CP should be indicated in STC;

Periodicity: periodicity of SSB transmission and should be in the range of {5, 10, 20, 40, 80, 160} ms or extended up to the range 320 and/or 640 and/or 1280 ms. The reason for periodicity extension is because at least for inter-node SSB transmission, longer periodicity can be assumed due to the fact that the IAB nodes are static or with extremely low mobility so that frequency transmission/measurement is not necessary;

Offset: this indicates the starting point of one SSB transmission periodicity in terms of slot/subframe/SFN. The value range of offset is from 0 to TP-1, where TP is the configured periodicity;

Duration: this indicates how long the configured SSB transmission will last;

SSB index: multiple SSBs can be transmitted in one SSB burst set and SSB index indicates which SSBs will be actually transmitted; and Location in the frequency domain: STC can either be located on the raster of initial access STC but Time Division Multiplexed (TDMed) with initial access STC or off the raster. In the latter case, the absolute location in the frequency domain of STC should be configured.

STC is not only configured for inter-node discovery but also for initial access of IAB nodes and access UEs. It has been agreed that these two types of SSBs should be at least TDMed. Therefore, at least 2 groups of STC should be configured as below:

Initial access STC (IAS) group: configured for initial access of access UEs and IAB MTs; and Inter-IAB node discovery (IND) group: configured for inter-node discovery purpose only.

At least one STC should be configured for IAS group and the maximum number of STCs can be defined in the Base Station (gNB) implementation. The configuration information can either be broadcast in system information or configured via F1AP interface.

For the IND group, at least 1 STC should be configured. However, configuring too many STC in an IND group will introduce high signaling overhead and a maximum value $K_{IND}$ may be defined. $K_{IND}$ can be determined by hop order and/or maximum number of neighboring IAB nodes and/or maximum number of SMTC per IAB node.

Single STC: only one STC is configured per IAB node for the IND group;

Hop order: the hop order is not expected to be larger than 4 so in this case, KIND can be up to 4;

Maximum number of neighboring IAB nodes: one IAB node is expected to hear up to two tier neighboring IAB nodes, i.e., 18 IAB nodes considering hexagon deployment, so in this case, KIND can be up to 18;

Maximum number of SMTC per IAB node: if KSMTC SMTC and KIND STC are configured per IAB node, inter-node discovery of up to $$\left( \frac{K_{SMTC} + K_{STC}}{K_{STC}} \right)$$

neighbouring IAB nodes can be supported. For example, if KSMTC=3, KIND can be chosen as 3 to support up to 20 neighboring IAB nodes discovery, i.e., at least two tiers.

Within the IAS group, the same or different numerology, periodicity, offset, duration and SSB index can be configured for each STC per IAB node deployed in different raster points or between different IAB nodes. For the IND group, the same principle may be employed because a different STC is supposed to be measured by different IAB nodes in a TDM manner, so at least different offset values should be configured for each STC per IAB node.

Therefore, a basic solution is to allow independent configurations for each STC in terms of numerology, periodicity, offset, duration and SSB index. However, this will introduce a high signaling overhead, especially when multiple STCs need to be configured per IAB node. One or more of the following arrangements may be considered for signaling overhead reduction.

For numerology, and/or periodicity and/or duration and/or SSB index, multiple STCs can be configured with the same value to reduce signaling overhead, i.e., configuring numerology, and/or periodicity and/or duration and/or SSB index for one STC and all the other STCs is expected to follow the same numerology, and/or periodicity and/or duration and/or SSB index.

Another option is to let the STC in IND group follow the numerology, periodicity, duration, and/or SSB index of the IAS group to further reduce signaling overhead. If numerology, periodicity, duration, and/or SSB index is configured for an STC, such a configuration can be applied; otherwise, an STC should follow the default configuration, e.g., IAS group configuration or one specific STC of IND group.

Figure 1A:
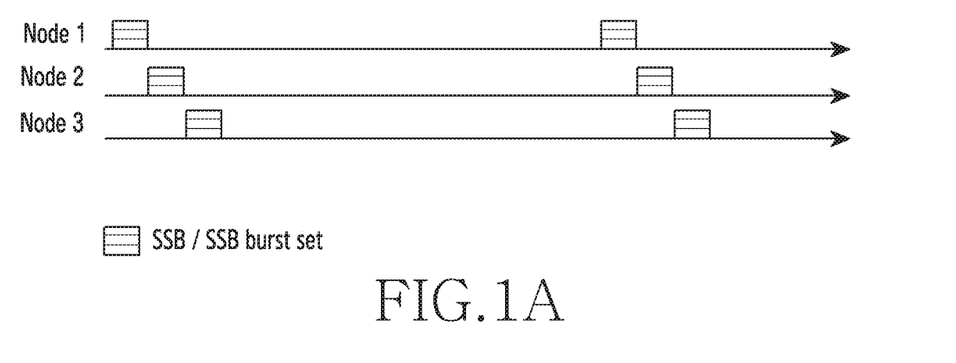
FIGS. 1A and 1B illustrate adjacent and non-adjacent SSB/SSB Burst set according to various embodiments of the disclosure.
Figure 1B:
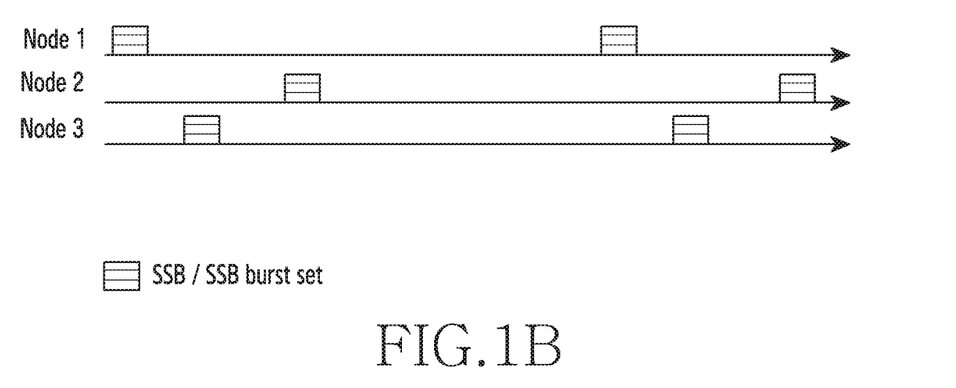

FIGS. 1A and 1B illustrate adjacent and non-adjacent SSB/SSB Burst set according to various embodiments of the disclosure.

Referring to FIG. 1A, multiple STCs of different IAB nodes can be configured adjacent or at least close to each other within a certain time window. Such a configuration has the benefit of simple SMTC configuration, especially when the same periodicity is configured to multiple STCs of different IAB nodes. For example, a single SMTC can be configured to measure all SSBs in one occasion and therefore signaling overhead can be potentially reduced. In addition, a single offset value can be configured for one IND group to reduce signaling overhead. For example, an offset value is configured to node 1, and so, for nodes 2 and 3, the offset value can be implicitly derived. However, if different periodicity is configured for each STC, a single SMTC may not be sufficient. Moreover, adjacent STC configurations may impose an additional scheduling constraint by enforcing all the nodes transmitting SSB in a certain time window.

Referring to FIG. 1B, another option is to configure non-adjacent STC. Such a configuration provides a higher level of flexibility, imposes less of a scheduling constraint and can easily handle the case of multiple STCs of different nodes with different periodicities. However, the corresponding SMTC configuration is more complicated and requires a higher signaling overhead.

When multiple STC are configured per IAB node, a simplification may be considered.

An IAB node may not need to monitor the link quality of the established links to its parent node(s) and child node(s) because such information can be derived from CSI measurement and reporting. In this sense, the total number of neighboring IAB nodes that an IAB MT needs to measure is reduced and less STC is needed.

It has been agreed that multiple SMTCs (at least 3) can be independently configured per IAB node, i.e., periodicity, offset and duration can be configured independently. A consideration here is how to match the measurement occasions, i.e., SMTC, with transmission occasions, i.e., STC, subject to the half-duplex constraint. Potential enhancements for SMTC are as follows:

PCI List: In the current NR specification, two SMTCs can be configured per node, one for the serving node and another for neighboring nodes. For the second SMTC for neighboring nodes, an RRC parameter pci-list is configured so that a UE knows which node(s) are to be measured. In IAB networks, the serving node is treated in the same way as neighboring nodes by the IAB MT so that there is not a dedicated SMTC for the serving node measurement anymore. In each SMTC, multiple neighboring nodes might need to be measured. In such a case, the RRC parameter pci-list should be configured independently for each SMTC.

SMTC Duration: In the current NR spec, the duration of one SMTC can be up to 5 ms. This duration can be extended especially for the adjacent STC case as shown in FIG. 2.

Figure 2:
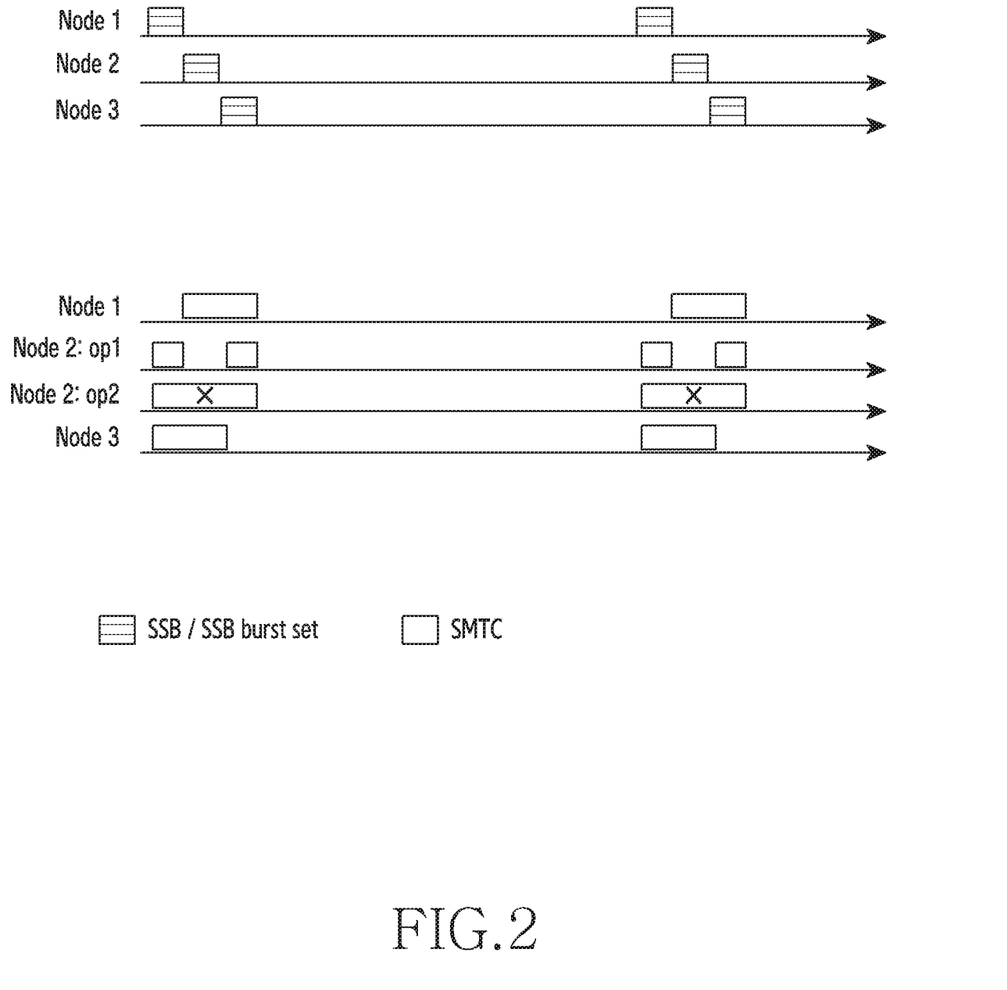
FIG. 2 illustrates an arrangement of STC and corresponding SMTC for multiple adjacent STC according to an embodiment of the disclosure.

FIG. 2 illustrates an arrangement of STC and corresponding SMTC for multiple adjacent STC according to an embodiment of the disclosure.

Referring to FIG. 2, a single SMTC can be configured for both node 1 and 3. Since two SSBs/SSB burst sets need to be measured in this SMTC, its duration should be doubled. Considering the case with more IAB nodes to measure, SMTC duration should be extended M times, where M is in the range of 2 to 8. For node 2, there are two different options (op1 and op2).

For option 1, two short SMTCs are configured to measure node 1 and 3, respectively, subject to the half-duplex constraint. For option 2, a single long SMTC is configured but once the SMTC collides with the SMTC's own STC configuration, the SMTC is overridden by the STC, i.e., instead of measuring other nodes, node 2 transmits SSB in the slot marked as X in the figure. The benefit of such a configuration is that only one SMTC needs to be configured and so the signaling overhead can be reduced. When considering the case with more nodes involved, the signaling overhead reduction is significant. Such an overriding rule can be either implicitly or explicitly configured.

Figure 3:
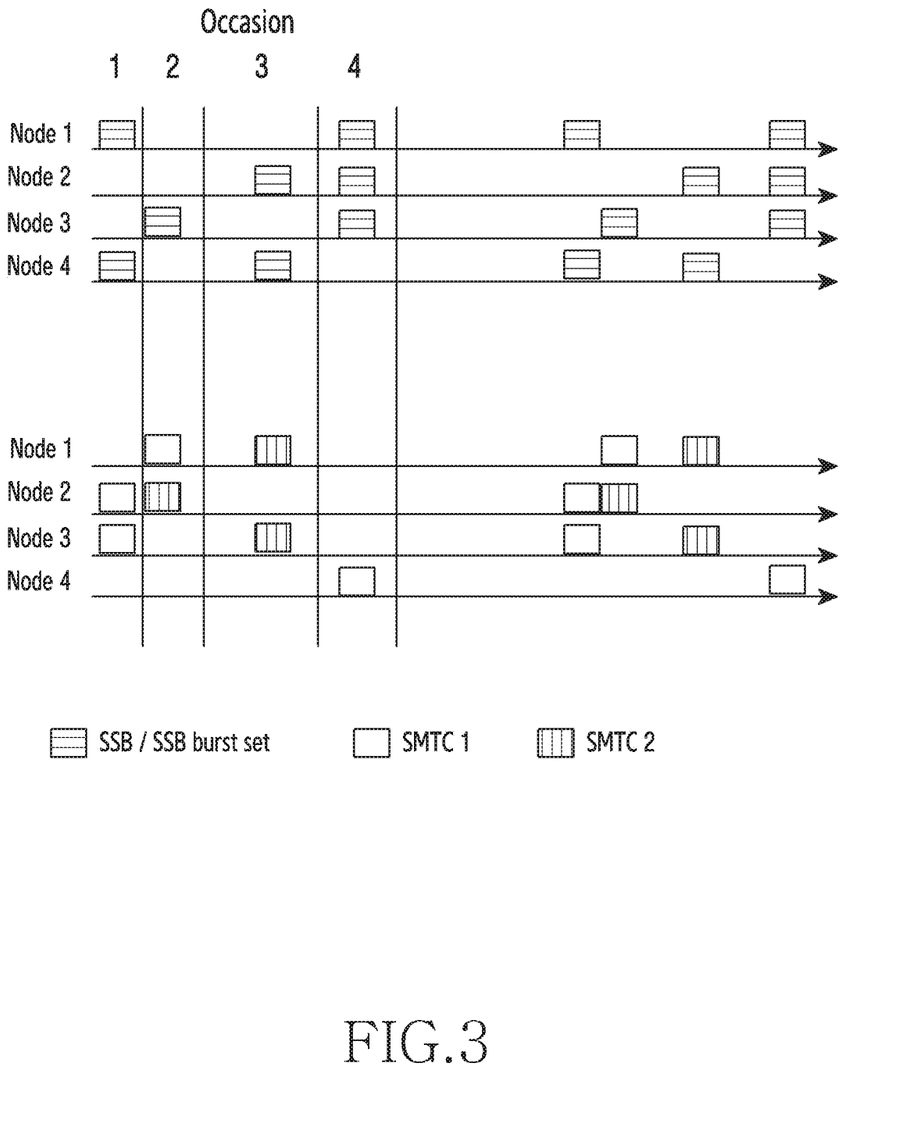
FIG. 3 illustrates an arrangement of STC and corresponding SMTC for multiple non-adjacent STC according to an embodiment of the disclosure.

FIG. 3 illustrates an arrangement of STC and corresponding SMTC for multiple non-adjacent STC according to an embodiment of the disclosure.

Referring to FIG. 3, for non-adjacent STCs, multiple SMTCs can be configured. As mentioned before, multiple STCs can be configured per IAB node and, as shown in FIG. 3, each node is configured with two STCs and two SMTCs for measurement. The following configurations may be employed:

Node 1: node 1 transmits SSB in occasion 1 and 4 based on STC and measures node 3 in occasion 2 and node 2 and 4 in occasion 3;

Node 2: node 2 can be configured with 2 SMTCs with normal duration and measures node 1 and 4 in occasion 1 and node 3 in occasion 2. Node 2 can also be configured with a single SMTC with longer duration to measure all the other nodes. The latter configuration has lower signaling overhead;

Node 3: for node 3, two SMTCs are configured. In occasion 1, node 3 can measure node 1 and 4 and in occasion 3, node 3 can measure node 2 and 4. In such a case, node 4 is measured twice. However, if pci-list is configured (see previously), node 3 can only measure node 2 in occasion 3 to reduce measurement complexity. Another alternative is to split the measurement of node 4 into two occasions, e.g., measure some beams from node 4 in occasion 1 and other beams from node 4 in occasion 2. This can be achieved by configuring different SSB index for the two STCs of node 4;

Node 4: node 4 is configured with a single SMTC and measures node 1, 2 and 3 in occasion 4.

Figure 4:
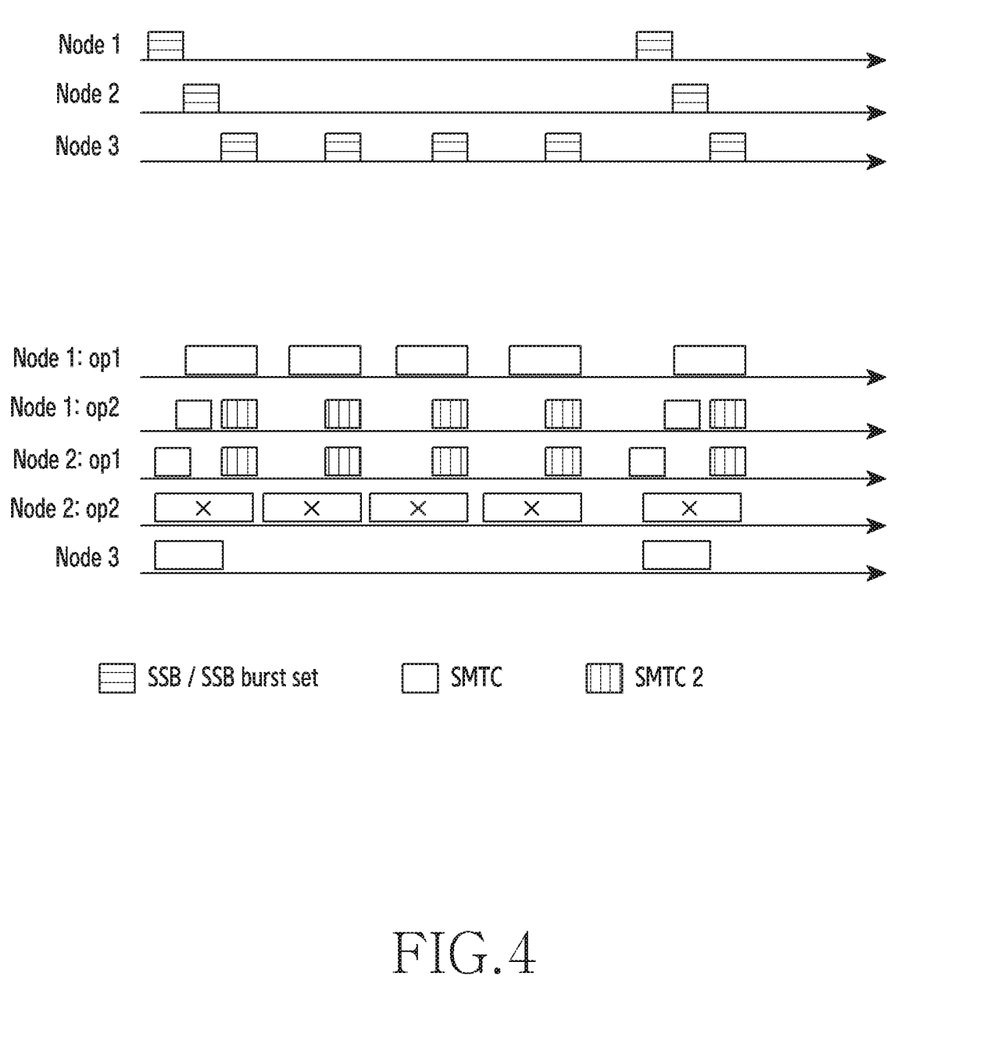
FIG. 4 illustrates an arrangement of STC and corresponding SMTC for different STC periodicities according to an embodiment of the disclosure.

FIG. 4 illustrates an arrangement of STC and corresponding SMTC for different STC periodicities according to an embodiment of the disclosure.

Referring to FIG. 4, such a configuration can also be extended to the case where periodicities of different nodes are different. The periodicity of node 3 is a quarter of the periodicity of nodes 1 and 2. The following configurations may be considered:

Node 1:

Op1: a single SMTC with longer periodicity can be configured. The benefit of such a configuration is that only one SMTC needs to be configured so that the signaling overhead can be reduced. However, it may measure nothing in some occasions and so impose an unnecessary scheduling constraint;

Op2: multiple SMTCs are configured with different periodicities.

Node 2: same as node 1, two options can be considered;

Node 3: a single longer SMTC can be configured.

Figure 5:
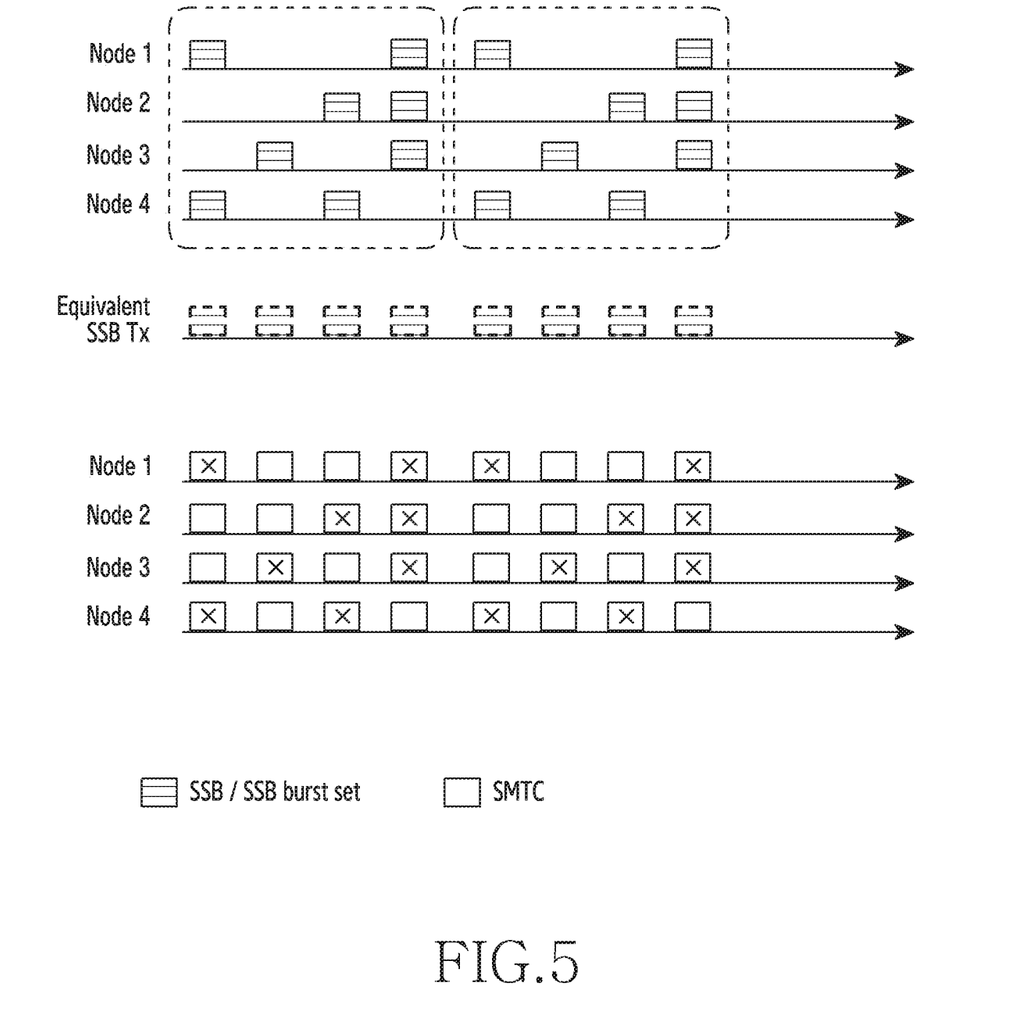
FIG. 5 illustrates an arrangement of SMTC for equivalent periodic STC according to an embodiment of the disclosure.

FIG. 5 illustrates an arrangement of SMTC for equivalent periodic STC according to an embodiment of the disclosure.

Referring to FIG. 5, if STC can be coordinated across multiple nodes, the overall equivalent SSB/SSB burst set transmission can be periodic. The equivalent SSB Tx is uniformly distributed in a periodic manner, as shown.

In such a case, a single SMTC can be configured for each node to simply measure every SSB Tx occasion. When STC collides with SMTC, the aforementioned overriding rule can be applied.

For example, node 1 needs to transmit SSB in occasion 1 and 4 (marked with X in the lower part of the figure) even though its SMTC configuration indicates to measure other nodes. One issue for such configuration is the IAB MT does not know which neighboring IAB node(s) to measure in a certain occasion. One solution is to configure a pci-list with all potential IAB nodes, let the IAB MT measure SSBs from other IAB nodes blindly and identify each IAB node by exploring the ZC sequence correlation property.

Another solution is to configure multiple pci-lists so an IAB MT knows which IAB node(s) to measure in each occasion. For example, two pci-list are configured for node 1, one including node 3 and another including nodes 2 and 4.

In the current NR specification, different numbers of SMTCs are configured for RRC-IDLE and RRC_Connected states. For RRC_IDLE state, only one SMTC is allowed but for RRC_Connected state, two SMTCs may be configured. However, in IAB networks, even in RRC_IDLE state, the IAB MT still needs to monitor neighboring IAB nodes so more than one SMTC should be configured in RRC_IDLE state.

In the current NR specification, SMTC is not defined for RRC_INACTIVE state. However, for IAB MT, it may stay in RRC_INACTIVE state and if that happens, the number of SMTC windows should be defined. It can either be fewer SMTC windows than the RRC_CONNECTED state (e.g., one SMTC window to reduce signaling overhead), or multiple SMTC windows (e.g., the same number of SMTC windows as in RRC_CONNECTED state).

Moreover, RRC_IDLE and RRC_INACTIVE states may not be defined for IAB MT. In such a case, long Discontinuous Reception (DRX) may be defined for IAB MT which remains in RRC_ACTIVE state. A different number of SMTC windows can be defined when IAB MT is active and sleeping following the same principles mentioned above, e.g., same or fewer SMTC windows for sleeping compared to active.

In addition, the STC and SMTC configurations should take hop order into account for the following reasons:

Avoiding Uplink (UL)/Downlink (DL) switching: there are two cases: 1) an IAB node, denoted as node A, can receive where its parent node and other IAB node with the same hop order of its parent node transmit in slot n; and 2) IAB node A and other IAB nodes with the same hop order receive at the same time in slot n. For case 1, STC can be configured for parent node(s) of IAB node A and SMTC can be configured for IAB node A in the same time slot n without need for UL/DL switching at either side. However, for case 2, if STC is configured for parent node(s) of IAB node A and SMTC is configured for IAB node A in the same time slot n, UL/DL switching is needed due to half-duplex constraint. Two groups of STC/SMTC can be considered, where one group is for intra-layer and another for inter-layer.

Taking hop order into account may potentially reduce the number of transmission/measurement occasions, leading to lower signaling overhead and complexity and higher efficiency.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an integrated access and backhaul (IAB) node in a wireless communication system, the method comprising:
   receiving, from a base station, configuration information including:
      one or more of a numerology, a periodicity, an offset, or a duration, for synchronization signal blocks (SSBs); and
      at least one SSB measurement timing configuration (SMTC) for IAB node discovery, wherein each SMTC in the at least one SMTC includes a cell list used for IAB node discovery; and
   based on the configuration information, measuring SSBs for IAB node discovery of one or more IAB nodes.

2. The method of claim 1, further comprising:
   receiving, from the base station, SSB transmission configuration (STC) comprising information elements related to one or more SSB index, location in a frequency domain, the numerology, the periodicity, the offset, or the duration; and transmitting an SSB or SSB burst set according to the information elements in the STC, wherein a plurality of STCs are defined as relating to at least one of initial access (IAS) or inter-IAB node discovery (IND).

3. The method of claim 2 wherein, for the IND case, a plurality of STCs are defined up to a maximum value $K_{IND}$, which is determined by one or more of hop order, maximum number of neighboring IAB nodes, or maximum number of SMTCs per IAB node.

4. The method of claim 2, wherein STCs of different IAB nodes are configured to be either:

adjacent or substantially adjacent to each other within a defined time period, or non-adjacent to each other within a defined time period.

5. The method of claim 2, wherein STC configuration is coordinated across different IAB nodes.

6. The method of claim 1, wherein a duration of the each SMTC is defined that multiple neighboring nodes are measured within one SMTC duration.

7. The method of claim 6, wherein the duration is defined such that the duration collides with its own STC configuration and the STC configuration overrides the at least one SMTC.

8. The method of claim 1, wherein the at least one SMTC depends on RRC state or DRX state.

9. The method of claim 1, wherein each SMTC in the at least one SMTC includes a periodicity and an offset used for IAB node discovery.

10. The method of claim 1, wherein each SMTC in the at least one SMTC includes a duration used for IAB node discovery.

11. An apparatus of an integrated access and backhaul (IAB) node in wireless communication system, the apparatus comprising:

a transceiver; and at least one processor operably coupled to the transceiver, and configured to:

receive, from a base station, configuration information including:

one or more of a numerology, a periodicity, an offset, or a duration, for synchronization signal blocks (SSBs), and at least one SSB measurement timing configuration (SMTC) for IAB node discovery, wherein each SMTC in the at least one SMTC includes a cell list used for IAB node discovery, and based on the configuration information, measure SSBs for IAB node discovery of one or more IAB nodes.

12. The apparatus of claim 11, wherein the at least one processor is further configured to:

receive from the base station, SSB transmission configuration (STC) comprising information elements related to one or more SSB index, location in a frequency domain, the numerology, the periodicity, the offset, or the duration, and transmit an SSB or SSB burst set according to the information elements in the STC, and wherein a plurality of STCs are defined relating to at least one of initial access (IAS) or inter-IAB node discovery (IND).

13. The apparatus of claim 12, wherein for the IND case, a plurality of STCs are defined up to a maximum value $K_{IND}$, which is determined by one or more of hop order, maximum number of neighboring IAB nodes, or maximum number of SMTCs per IAB node.

14. The apparatus of claim 12, wherein STCs of different IAB nodes are configured to be either:

adjacent or substantially adjacent to each other within a defined time period, or non-adjacent to each other within a defined time period.

15. The apparatus of claim 12, wherein STC configuration is coordinated across different IAB nodes.

16. The apparatus of claim 11, wherein a duration of the each SMTC is defined such that multiple neighboring nodes are measured within one SMTC duration.

17. The apparatus of claim 16, wherein the duration is defined such that the duration collides with its own STC configuration and the STC configuration overrides the at least one SMTC.

18. The apparatus of claim 11, wherein the at least one SMTC depends on RRC state or DRX state.

19. The apparatus of claim 11, wherein each SMTC in the at least one SMTC includes a periodicity and an offset used for IAB node discovery.

20. The apparatus of claim 11, wherein each SMTC in the at least one SMTC includes a duration used for IAB node discovery.

* * * * *